(12) United States Patent
Hahn et al.

(10) Patent No.: US 10,481,797 B2
(45) Date of Patent: Nov. 19, 2019

(54) DATA STORAGE DEVICE FOR COMPRESSING INPUT DATA

(71) Applicants: SK hynix Inc., Gyeonggi-do (KR); Seoul National University R&DB FOUNDATION, Seoul (KR)

(72) Inventors: Sangwook Shane Hahn, Daejeon (KR); Hoyoon Jun, Seoul (KR); Jihong Kim, Seoul (KR)

(73) Assignees: SK hynix Inc., Gyeonggi-do (KR); Seoul National University R&DB Foundation, Seoul (KR)

( * ) Notice: Subject to any disclaimer, the term of this patent is extended or adjusted under 35 U.S.C. 154(b) by 371 days.

(21) Appl. No.: 15/409,725

(22) Filed: Jan. 19, 2017

(65) Prior Publication Data

US 2018/0024748 A1    Jan. 25, 2018

(30) Foreign Application Priority Data

Jul. 19, 2016  (KR) .................. 10-2016-0091456

(51) Int. Cl.
*G06F 3/06* (2006.01)
*G06F 12/1009* (2016.01)

(52) U.S. Cl.
CPC .......... *G06F 3/0608* (2013.01); *G06F 3/0656* (2013.01); *G06F 3/0659* (2013.01);
(Continued)

(58) Field of Classification Search
CPC ..... G06F 3/0608; G06F 3/0656; G06F 3/0659
See application file for complete search history.

(56) References Cited

U.S. PATENT DOCUMENTS 9,367,557 B1 *   6/2016  Lin ................. G06F 16/1744
2011/0320915 A1 * 12/2011  Khan ................ G06F 3/0608
                                                                714/773

(Continued)

FOREIGN PATENT DOCUMENTS

KR    1020110138707    12/2011
KR    1020130081534    7/2013

OTHER PUBLICATIONS

Zuck, Aviad et al, Compression and SSD: Where and How?, INFLOW '14, 2nd Workshop on Interactions of NVM/FLash with Operating Systems and Workloads—USENIX 2014 https://www.usenix.org/node/187072 (Year: 2014).*

(Continued)

*Primary Examiner* — Ryan Bertram
*Assistant Examiner* — Edmund H Kwong
(74) *Attorney, Agent, or Firm* — IP & T Group LLP

(57) ABSTRACT

A data storage device may include: a memory cell array, a data buffer configured to generate a data chunk including a plurality of pages from input data provided from a host, a data compressor configured to compress the data chunk and output the compressed data chunk as write data, a write queue configured to store the write data on a page basis, a mapping table configured to store a mapping relationship between a logical address and a data chunk address, and a mapping relationship between the data chunk address and a physical address; and a controller configured to control an operation of storing the write data outputted from the write queue in the memory cell array such that a page including both a part of any one compressed data chunk and a part of another compressed data chunk is written to the memory cell array.

20 Claims, 12 Drawing Sheets

(52) U.S. Cl.
CPC .......... G06F 3/0661 (2013.01); G06F 3/0673 (2013.01); G06F 12/1009 (2013.01); *G06F 2212/401* (2013.01)

(56) References Cited

U.S. PATENT DOCUMENTS

| | | | |
|---|---|---|---|
| 2017/0115922 A1* | 4/2017 | Imaeda | G06F 3/0604 |
| 2017/0123679 A1* | 5/2017 | Yoshii | G06F 3/06 |

OTHER PUBLICATIONS

Chang, L., On Efficient Wear Leveling for Large-Scale Flash-Memory Storage Systems, Proceedings of the 2007 ACM symposium on Applied computing, 2007, pp. 1126-1130.

Kim, T. et al., FineDedup: A Fine-Grained Deduplication Technique for Flash-Based SSDs, 2012, International Conference on Memory Architecture and Organization Workshop.

Lee, S. et al., FlashBench: A Workbench for a Rapid Development of Flash-Based Storage Devices, International Symposium on Rapid System Prototyping, 2012, pp. 163-169, IEEE.

Lin, X. et al. Migratory Compression: Coarse-grained Data Reordering to Improve Compressibility, 12th USENIX Conference on File and Storage Technologies, 2014, pp. 257-271.

Sommer, N., Signal Processing and the Evolution of NAND Flash Memory, Embedded Computing Design, Dec. 2010, vol. 8, No. 8, pp. 8-10.

\* cited by examiner

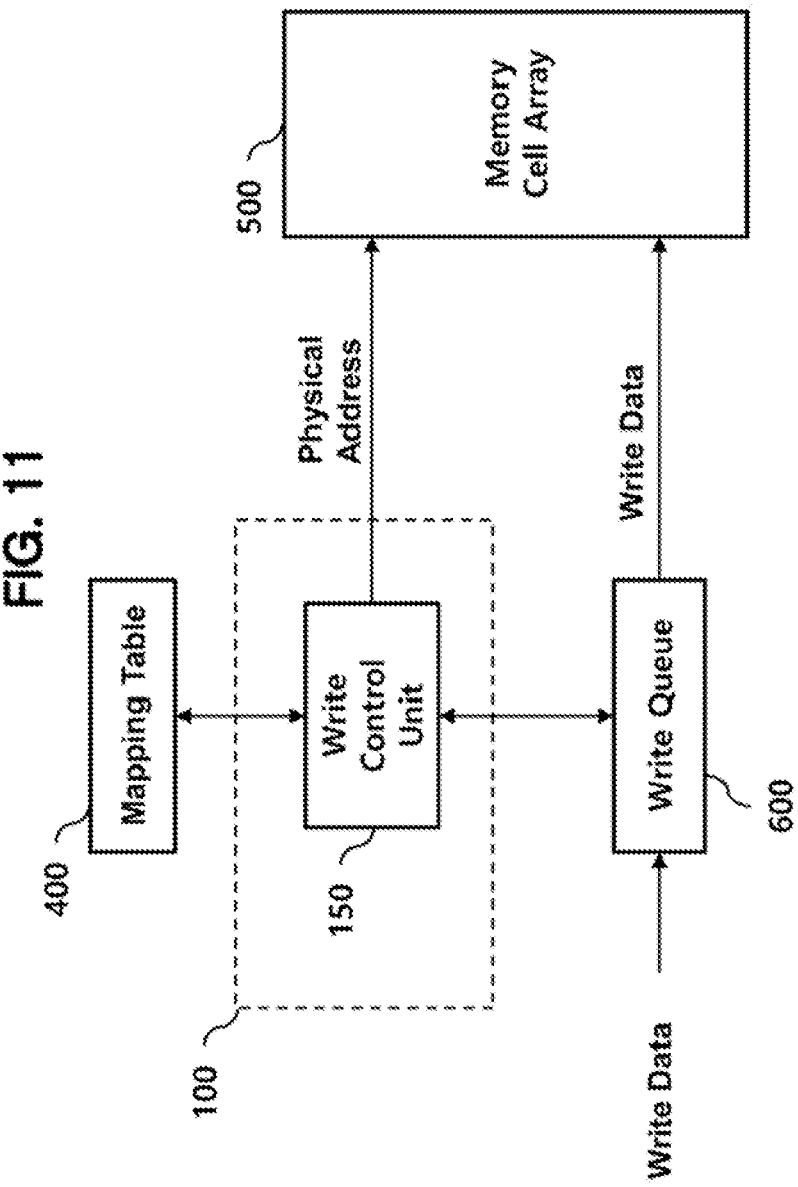

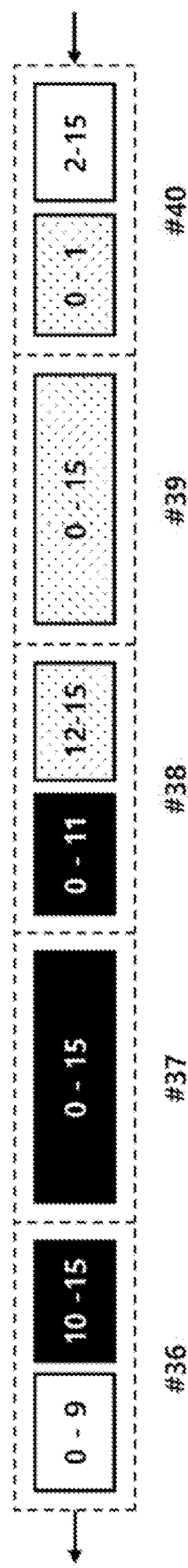

DATA STORAGE DEVICE FOR COMPRESSING INPUT DATA

CROSS-REFERENCE TO RELATED APPLICATIONS

The present application claims priority under 35 U.S.C. 119(a) to Korean Patent Application No. 10-2016-0091456, filed on Jul. 19, 2016, which is incorporated herein by reference in its entirety.

BACKGROUND

1. Field

Exemplary embodiments of the present invention relate to a data storage device, and more particularly, to a data storage device for compressing and storing data.

2. Description of the Related Art

A data storage device including a semiconductor memory device, such as SSD (Solid State Drive), requires a high cost to store large-volume data.

In the case of a NAND flash memory, plural pieces of bit information are stored in one cell. Thus, the lifetime of the cell tends to be reduced.

Therefore, there has been developed a technique which compresses and stores data, thereby lowering a cost against a storage capacity while increasing the lifetime of a data storage device.

A NAND-based memory device stores data on a page basis. When page data are compressed, the lengths thereof are not sorted on a page basis.

Thus, when the compressed data are stored on a page basis, a part of the page may be wasted, making more difficult to increase the storage capacity.

For example, when 32 Kbyte data corresponding to four pages are compressed into 17 Kbyte data under the supposition that a page size is set to 8 Kbyte, the 17 Kbyte data are stored in three pages. In this case, a storage space of 7 Kbyte is wasted.

Thus, there is required an improved technique capable of compressing and storing data while preventing a waste of a storage space.

SUMMARY

Various embodiments of the present invention are directed to a data storage device which compresses and stores data on a data chunk basis including a plurality of pages.

Also, various embodiments are directed to a data storage device which generates a data chunk by collecting pages having a high similarity in characteristics such as data pattern, thereby improving a compression rate of data.

Also, various embodiments are directed to a data storage device which selectively compresses and stores a plurality of pages.

Also, various embodiments are directed to a data storage device capable of reducing the size of a mapping table.

In an embodiment, a data storage device may include: a memory cell array, a data buffer configured to generate a data chunk including a plurality of pages from input data provided from a host, a data compressor configured to compress the data chunk and output the compressed data chunk as write data, a write queue configured to store the write data on a page basis, a mapping table configured to store a mapping relationship between a logical address and a data chunk address, and a mapping relationship between the data chunk address and a physical address; and a controller configured to control an operation of storing the write data outputted from the write queue in the memory cell array such that a page including both a part of any one compressed data chunk and a part of another compressed data chunk is written to the memory cell array.

BRIEF DESCRIPTION OF THE DRAWINGS

The above and other features and advantages of the present invention will become more apparent to those skilled in the art to which the present invention belongs by the following detailed description of various embodiments of the invention with reference to the attached drawings in which:

FIG. 6 is a diagram illustrating a state in which a data chunk is stored in a physical page in the mapping table of FIG. 5.

FIG. 8 is a diagram illustrating a state in which a data chunk is stored in a physical page in the mapping table of FIG. 7.

FIG. 10 is a diagram illustrating a state in which a data chunk is stored in a physical page in the mapping table of FIG. 9.

FIG. 11 is a block diagram for describing a method of the data storage device of FIG. 1 for writing data stored in a write queue in a memory cell array.

FIG. 12 is a diagram illustrating an operation of the write queue of FIG. 1.

DETAILED DESCRIPTION

Figure 1:
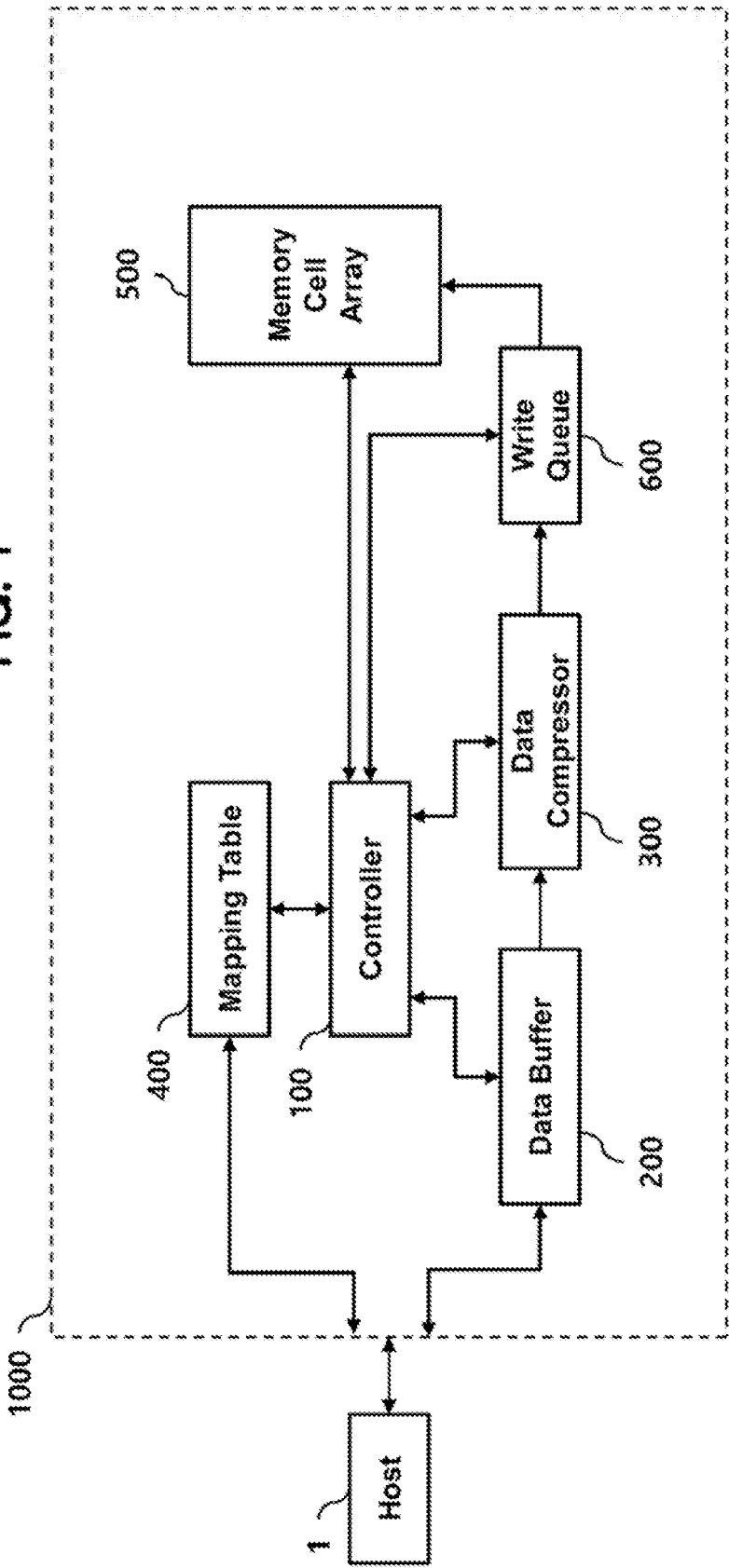
FIG. 1 is a block diagram illustrating a data storage device, according to an embodiment of the present invention.

Hereinafter, a data storage device and an operating method thereof according to the present invention will be described with reference to the accompanying drawings through exemplary embodiments of the present invention. The present invention may, however, be embodied in different forms and should not be construed as being limited to the embodiments set forth herein. Rather, these embodiments are provided to describe the present invention in detail to the extent that a person skilled in the art to which the invention pertains can enforce the technical concepts of the present invention.

It is to be understood that embodiments of the present invention are not limited to the particulars shown in the drawings, that the drawings are not necessarily to scale, and, in some instances, proportions may have been exaggerated in order to more clearly depict certain features of the invention. While particular terminology is used, it is to be appreciated that the terminology used is for describing particular embodiments only and is not intended to limit the scope of the present invention.

It is further noted that in the following description, specific details are set forth for facilitating the understanding of the present invention, however, the present invention may be practiced without some of these specific details. Also, it is noted, that well-known structures and/or processes may have only been described briefly or not described at all to avoid obscuring the present disclosure with unnecessary well known details.

It is also noted, that in some Instances, as would be apparent to those skilled in the relevant art, an element (also referred to as a feature) described in connection with one embodiment may be used singly or in combination with other elements of another embodiment, unless specifically indicated otherwise.

Hereinafter, the various embodiments of the present invention will be described in detail with reference to the attached drawings.

FIG. 1 is a block diagram Illustrating a data storage device 1000 according to an embodiment of the present invention.

The data storage device 1000 according to the embodiment of FIG. 1, may include a controller 100, a data buffer 200, a data compressor 300, a mapping table 400, a memory cell array 500 and a write queue 600.

The memory cell array 500 may be a memory device which reads and writes data on a page basis. For example, the memory cell array 500 may include a flash memory cell array or another type of memory cell array. In an embodiment, the memory cell array 500 may be a NAND flash memory cell array.

The controller 100 may control an operation of inputting/outputting data to/from the memory cell array. e.g., to/from a NAND flash memory cell array.

The controller 100 may perform an operation which is performed by a Flash Translation Layer (FTL), such as an address mapping operation, a garbage collection operation, a wear leveling operation, and the like.

In the present embodiment, the controller 100 may control the data buffer 200, the data compressor 300, the mapping table 400 and the write queue 600.

The data buffer 200 may temporarily store input data provided from a host 1, and output a data chunk generated therefrom.

In the present embodiment, a data chunk may include one page or two or more pages. Preferably, the data chunk may include two or more pages.

In the present embodiment, a case where four pages form one data chunk is explained as an example.

The controller 100 may control an operation of the data buffer 200 to generate a data chunk based on the input data provided from the host 1.

For example, the controller 100 may change an order of the input data provided from the host, when generating the data chunk. This operation will be described in detail with reference to FIG. 2.

The data compressor 300 may compress the data chunk outputted from the data buffer 200 or may not compress the data chunk, and provides the data chunk to the write queue 600.

In the present embodiment, the controller 100 may control an operation of the data compressor 300 by determining whether to compress the data chunk.

When the controller 100 instructs the data compressor 300 to compress a data chunk, the data compressor 300 compresses the data chunk and provides the compressed data chunk to the write queue 600 as write data. When the controller 100 instructs the data compressor 300 not to compress a data chunk, the data compressor 300 provides the data chunk to the write queue 600 as write data without compressing the data chunk. This operation will be described in detail with reference to FIGS. 3 and 4.

The controller 100 controls an operation of storing the write data which are stored in the write queue 600 into the memory cell array 500 on a page basis. This operation will be described in detail with reference to FIGS. 11 and 12.

The mapping table 400 may store a mapping relationship between a logical address requested by the host 1 and a physical address of the memory cell array 500.

In the present embodiment, a data chunk may include a plurality of pages.

The mapping table 400 may store a first mapping relationship between a logical address and a data chunk, and a second mapping relationship between the data chunk and a physical address. For example, in an embodiment, the mapping table 400 may include a first table and a second table (See FIG. 7). The first table may store the first mapping relationship between a logical address and a data chunk, and the second table may store the second mapping relationship between the data chunk and a physical address.

The controller 100 may control the first and second tables according to whether a data chunk is compressed. This operation will be described in detail with reference to FIGS. 5 to 10.

Figure 2:
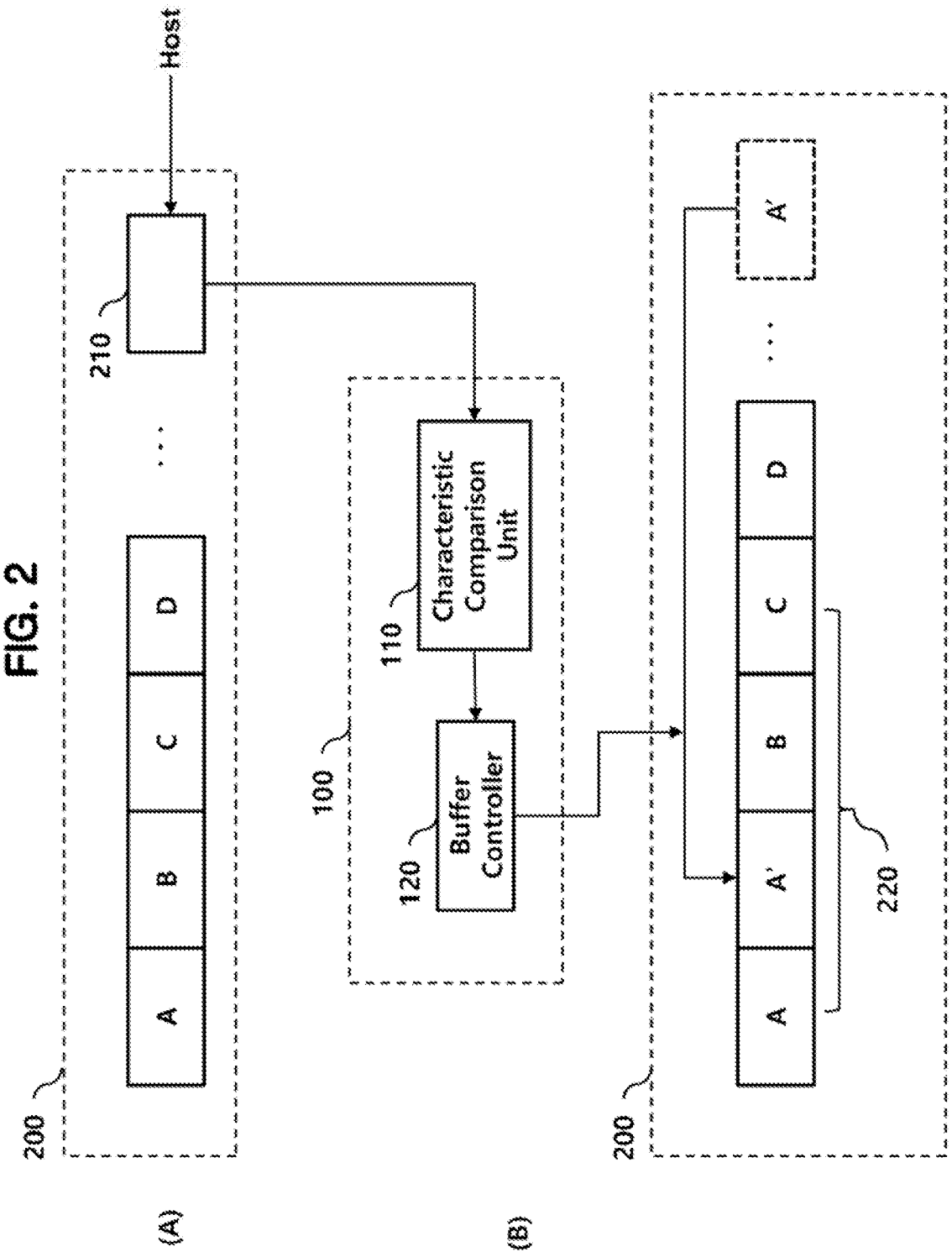
FIG. 2 is a diagram for describing a method of the data storage device of FIG. 1 for generating a data chunk including a plurality of pages.

FIG. 2 is a diagram for describing a method of the data storage device 1000 of FIG. 1 for generating a data chunk which includes data from a plurality of pages.

The data buffer 200 stores input data 210 from the host 1 on a page basis.

In FIG. 2, an upper portion (A) of FIG. 2 shows a state in which the input data 210 are newly stored in the data buffer 200 which already stores a plurality of pages.

The controller 100 may include a characteristic comparison unit 110 and a buffer control unit 120.

The characteristic comparison unit 110 may compare a characteristic of the input data 210 which are provided from the host 1 with a corresponding characteristic of already stored pages for determining whether the input data 210 includes a page having a similar characteristic to an already stored page.

The buffer control unit 120 may adjust an order of the input data 210 provided from the host 1 according to a comparison result of the characteristic comparison unit 110. For example, when the characteristic comparison unit 110 finds an already stored page having a similar characteristic as the input data 210 then the buffer control unit 120 may control the data buffer 200 to move the input data 210 to a position next to the corresponding page.

For example, the characteristic comparison unit 110 may analyze a pattern of the input data 210, and determine whether the input data 210 is a page having a similar data pattern to an already stored page.

The data pattern of a page may be expressed as a hash value which is calculated by applying a hash function. For reference, the hash function may be any function that can be used to map data of an arbitrary size to data of a fixed size. The values returned by the hash function may be called hash values.

In FIG. 2, the reference numerals "A", "B", "C" and "D" represent hash values corresponding to existing pages.

The characteristic comparison unit 110 may calculate the hash value of the input data 210.

For example, the characteristic comparison unit 110 may calculate a Rabin-Karp fingerprint and use the Rabin-Karp fingerprint as a hash value.

Suppose that the calculated hash value of the input data 210 is A'.

The characteristic comparison unit 110 may compare the calculated hash value with existing hash values of other pages, in order to find a page having the most similar hash value.

When there are no similar hash values, the characteristic comparison unit 110 may display that there are no pages having similar hash values.

For example, the characteristic comparison unit 110 may apply the "min-hash" technique to the hash value of the input data 210 and the hash values of the other pages, in order to determine a similarity between the input data and the existing pages.

When the characteristic comparison unit 110 finds a page having a similar hash value, the buffer control unit 120 controls the data buffer 200 to move the input data 210 to a position next to the page which has the similar hash value.

In FIG. 2, a lower portion (B) shows that the calculated hash value of the input data 210 is represented by the reference numeral "A'" and the input data is moved to a position next to a page having a hash value A similar to the hash value A'.

In the described embodiment, the data buffer 200 may output a data chunk 220 which includes four pages having a similar data pattern as determined by their hash values. As pages having a similar data pattern are compressed together, the compression rate can be improved.

In the embodiment of FIG. 2, the data buffer 200 may adjust the page order by taking into consideration the data pattern of each page.

In another embodiment, input data may be sequentially collected to generate a data chunk.

Figure 3:
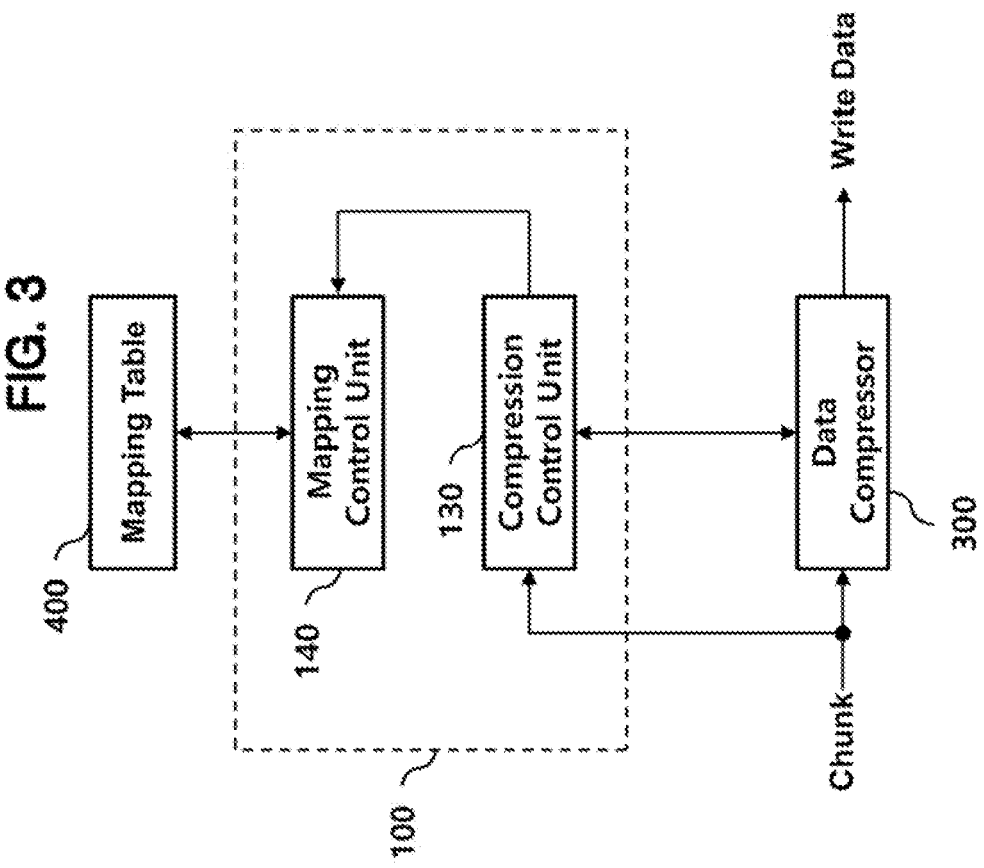
FIG. 3 is a diagram for describing a method of the data storage device of FIG. 1 to selectively compress the data chunk.

FIG. 3 is a diagram illustrating a method of the data storage device 1000 of FIG. 1 to selectively compress the data chunk.

In an embodiment, the data compressor 300 may compress an input data chunk and output the compressed data chunk as write data.

When data the repeatability of which is removed through encoding and compression, such as compressed video data, is additionally compressed, the size of the data is likely to increase after the compression, due to meta data required for decompression.

Thus, in the present embodiment, a selective compression method is provided that does not compress all the data chunks, but only selectively compresses certain data chunks.

As illustrated in the embodiment of FIG. 3, the controller 100 may include a compression control unit 130 and a mapping control unit 140. The compression control unit 130 and the mapping control unit 140 may be in addition to the buffer controller 120 and the characteristic comparison unit 110 shown in FIG. 2.

In the embodiment of FIG. 3, the data compressor 300 may output a data chunk as write data without compressing the data chunk or compress a data chunk and output the compressed data chunk as write data, according to the control of the compression control unit 130.

The compression algorithm used herein may include the LZRW (Lempel-Ziv Ross Williams) algorithm or other publicly known compression algorithms.

The compression control unit 130 monitors the compression rate. When a low compression rate is continued, the compression control unit 130 controls the data compressor 300 to output the data chunk as the write data without compressing the data chunk. Otherwise, the compression control unit 130 may control the data compressor 300 to compress the data chunk and output the compressed data chunk as the write data.

For example, the compression control unit 130 may determine a control signal by sampling a compression rate for every five data chunks.

The sampling cycle may differ depending on embodiments.

The mapping control unit 140 may control the mapping table 400 in response to the control signal outputted from the compression control unit 130.

During the sampling operation, the compression control unit 130 controls the data compressor 300 to compress a data chunk, and receives the compressed data to calculate a compression rate.

Inventors of the present invention found out that a compression rate has a predetermined locality by an experiment sequentially compressing a file data.

Based on the above finding, the compression control unit 130 may determine that data with a low compression rate are gathered in a corresponding region when the low compression rate is continued, and determine that data with a high compression rate are gathered in a corresponding region when the high compression rate is continued, through the sampling operation. Then, the compression control unit 130 may control whether to compress the data chunk based on a sampling result.

Figure 4:
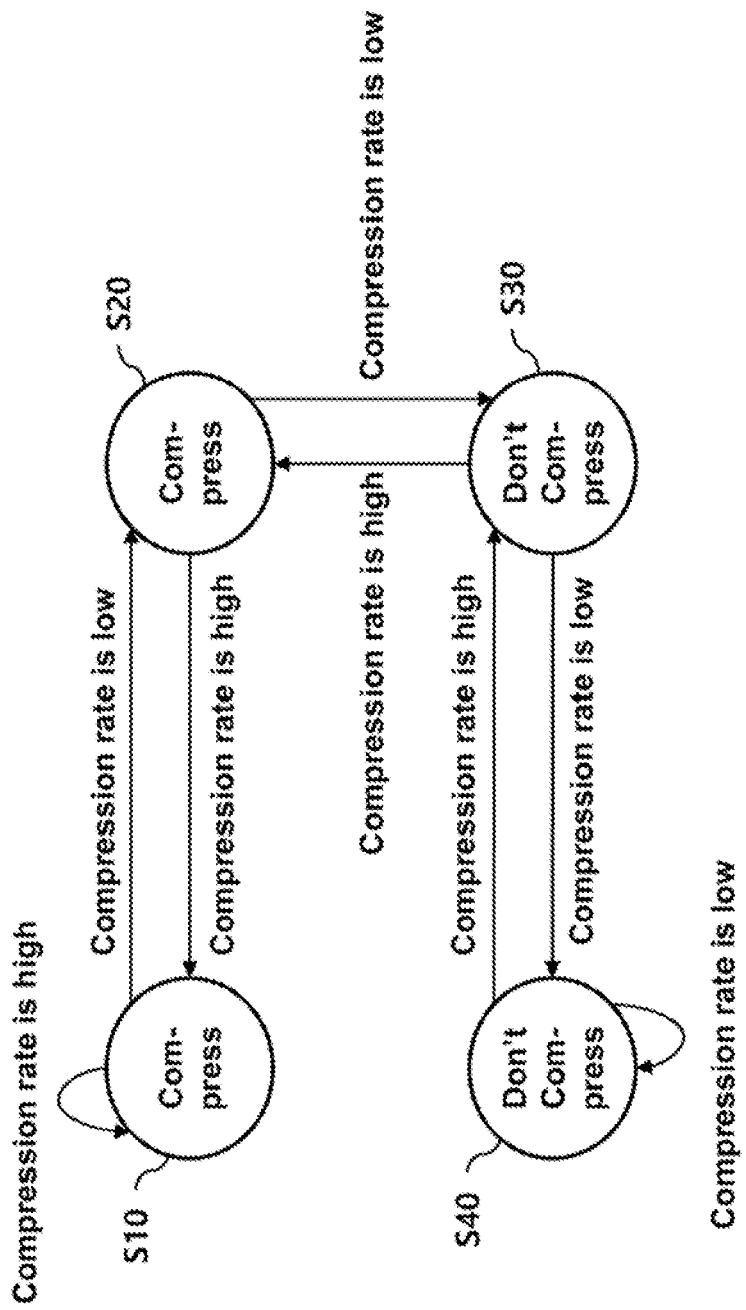
FIG. 4 is a state diagram for describing an operation of a compression control unit of FIG. 3.

FIG. 4 is a state diagram for describing an operation of the compression control unit 130 of FIG. 3.

In the present embodiment, when a sampling result indicating that the compression rate is lower than a threshold value is consecutively obtained a predetermined number of times, the compression control unit 130 may control the data compressor 300 not to compress a data chunk. On the contrary, when a sampling result indicating that the compression rate is equal to or higher than the threshold value is consecutively obtained a predetermined number of times, the compression control unit 130 may control the data compressor 300 to compress a data chunk.

For example, in the embodiment of FIG. 4, when a sampling result indicating that the compression rate is low is obtained two times in a row, the compression control unit 130 directs the data compressor 300 not to perform compression. This is explained in more detail below with the states S10 to S40 which indicate the state of the compression control unit 130. In the embodiment of FIG. 4, the compression control unit 130 may operate in four states S10 to S40.

In states S10 and S20, the compression control unit 130 controls the data compressor 300 to compress a data chunk, and in states S30 and S40, the compression control unit 130 controls the data compressor 30 not to compress a data chunk.

When, while in the state S10, it is determined, based on a sampling operation which may be performed as mentioned above every five chunks, for example, that the compression rate is high, the state S10 is maintained, and the compression control unit 130 continues to control the data compressor 300 to compress incoming data chunks. When, while in the state S10, it is determined, based on the sampling, that the compression rate is low in the state S10, the state S10 transitions to the state S20. In the state S20 the compression control unit 130 continues to control the data compressor 300 to compress incoming data chunks.

When, while in the state S20, it is determined, based on sampling, that the compression rate, the state S20 transitions back to the state S10. When, while in the state S20, based on sampling, it is determined that the compression rate is low in the state S20, the state S20 transitions to the state S30. In the State S30, the compression control unit 130 controls the data compressor 300 to not compress incoming data chunks. Hence when two consecutive compression rate samplings are determined to be low the compression controller 130 may switch from a compression perform state S10 to a non-compression perform state S30.

When, while in the state S30, it is determined that the compression rate is high in the state S30, the state S30 transitions to the state S20, and when it is determined that the compression rate is low in the state S30, the state S30 transitions to the state S40.

When it is determined that the compression rate is low in the state S40, the current state S40 is maintained, and when it is determined that the compression rate is high in the state S40, the state S40 transitions to the state S30.

In the present embodiment, when a resultant size obtained by compressing four pages is larger than three pages, the compression control unit 130 determines that the compression rate is low. Otherwise, the compression control unit 130 determines that the compression rate is high.

When a data chunk is not compressed, the controller 100 stores four pages included in a data chunk into the memory cell array 500 without compressing the data chunk, and the mapping table 400 stores a mapping relationship between a logical address and a physical address.

When a data chunk is compressed, the controller 100 stores write data obtained by compressing the data chunk, into the write queue 600, and the mapping table 400 stores a mapping relationship between a logical address and a data chunk address and a mapping relationship between the data chunk address and a physical address.

The mapping control unit 140 may control the mapping table 400 to store the mapping relationship between the logical address, the physical address and the data chunk address in response to the control signal outputted from the compression control unit 130, depending on whether the data chunk is compressed.

Figure 5:
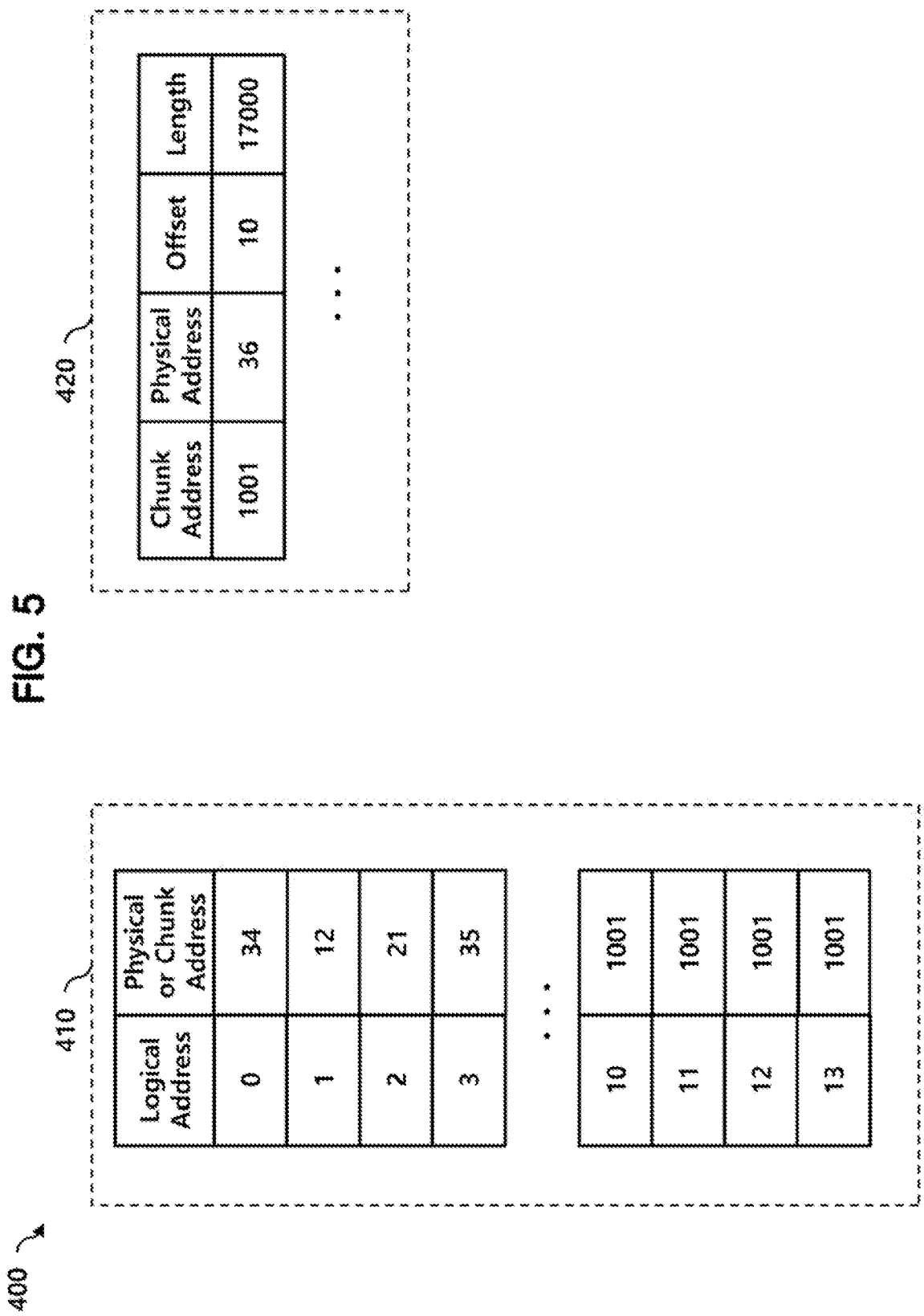
FIG. 5 is a diagram illustrating an example of a mapping table of FIG. 1.
Figure 6:
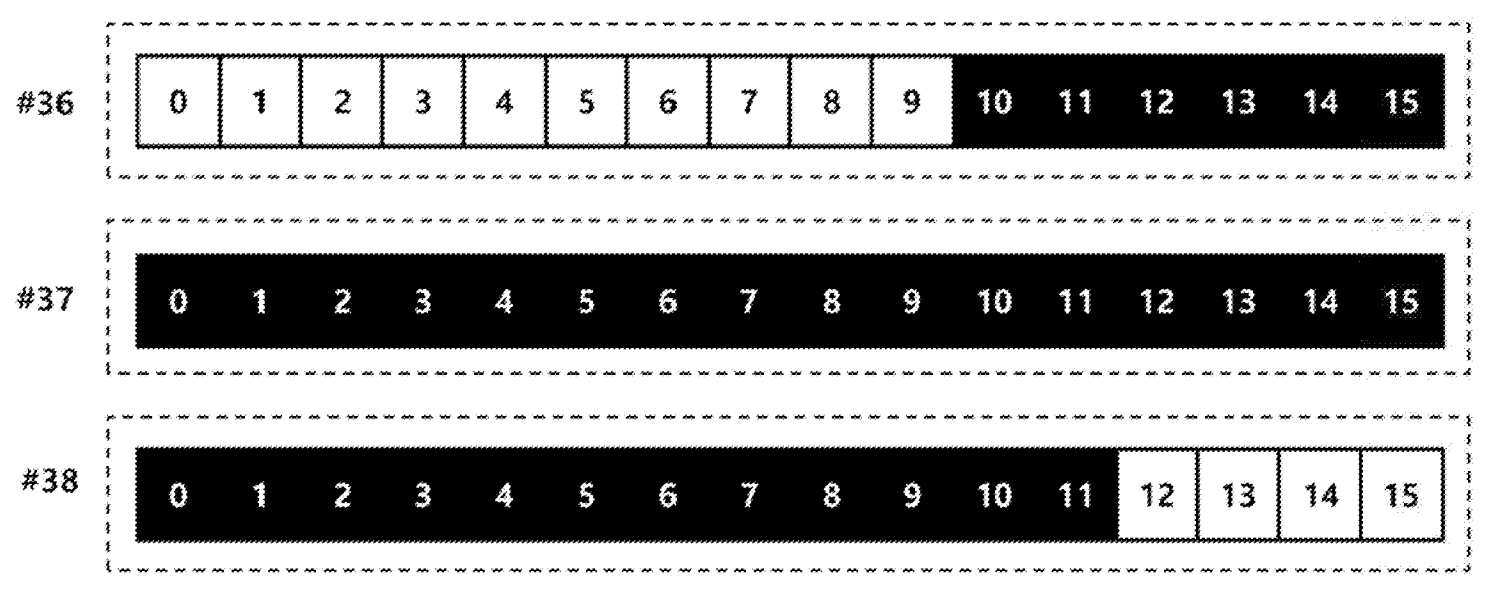

FIG. 5 shows an example of the mapping table 400 of FIG. 1. FIG. 6 is a diagram illustrating a state in which a data chunk is stored in a physical page in the mapping table 400 of FIG. 5.

The mapping table 400 may include a first table 410 and a second table 420.

The first table 410 may store the mapping relationship between a logical address and one of a physical address and a data chunk address, and the second table 420 may store the mapping relationship between the data chunk address and the physical address.

In the present embodiment, the logical address and the physical address may indicate a page-based address.

In the first table 410, the first field stores the logical address, and the second field stores the physical address or data chunk address.

In the present embodiment, the physical address and the data chunk address may be written to the same field. Therefore, different ranges of addresses are used in order to distinguish between the physical address and the data chunk address.

Suppose that numbers of 0 to 999 are used as physical addresses and numbers following 1,000 are used as data chunk addresses.

Thus, it is possible to determine whether the page of the corresponding logical address is compressed or not, based on the value of the second field.

In the present embodiment, since the physical address and the data chunk address share one field, the size of the first table 410 can be reduced.

In another embodiment, a flag field may be added to determine whether a value stored in the second field of the first table 410 is a physical address or data chunk address. In this case, the size of the first table 410 may increase due to the flag field.

When a data chunk is stored without compression, the mapping control unit 140 may control the mapping table 400 to store the mapping relationship between the logical address and the physical address in the first table 410.

When a data chunk is compressed and stored, the mapping control unit 140 may control the mapping table 400 to store the mapping relationship between the logical address and the data chunk address in the first table 410, and store the mapping relationship between the data chunk address and the physical address in the second table 420.

In FIG. 5, logical addresses 0, 1, 2 and 3 are allocated to physical addresses 34, 12, 21 and 35, and logical addresses 10, 11, 12 and 13 are allocated to a data chunk address 1001.

In FIG. 5, the second table 420 may include a data chunk address field, a physical address field, an offset field and a length field.

The data chunk address field may store a data chunk address, the physical address field may store a physical address from which a compressed data chunk is stored, the offset field may store information on a start position of a compressed data chunk corresponding to the data chunk address in a physical address, and the length field may store a length of the compressed data chunk.

The offset may be defined as an order of sub-pages when one page is divided into a plurality of sub-pages.

In the present embodiment, suppose that the size of a page is 8 Kbyte and one page is divided into 16 sub-pages. At this time, one sub-page is composed of 512 bytes.

The size of a sub-page may be set to various values depending on embodiments.

In the present embodiment, when a compressed data chunk is written, the compressed data chunk is written to from the sub-page next to the previously written compressed data chunk, which makes it possible to prevent the consumption of a remaining space.

In FIG. 5, one compressed data chunk is written to consecutive physical addresses.

Thus, in FIG. 6, a compressed data chunk corresponding to the data chunk address 1001 is written to a space from a 10th sub-page of a 36th page, i.e., from the 5120th byte of the 36th page, to a 11th sub-page of a 38th page.

Since the length of the data is 17,000 byte, 104 bytes of the 11th sub-page of the 38th page may be wasted. However, the size of the wasted space is significantly reduced, compared to the related art.

When the size of the sub-page is reduced, a space waste can be reduced in the physical pages. However, since the number of bits contained in the data stored in the offset field needs to be increased, the size of the second table 420 may be increased.

Hereinafter, a case where two consecutive compressed data chunks are stored in a mapping table is explained.

Figure 7:
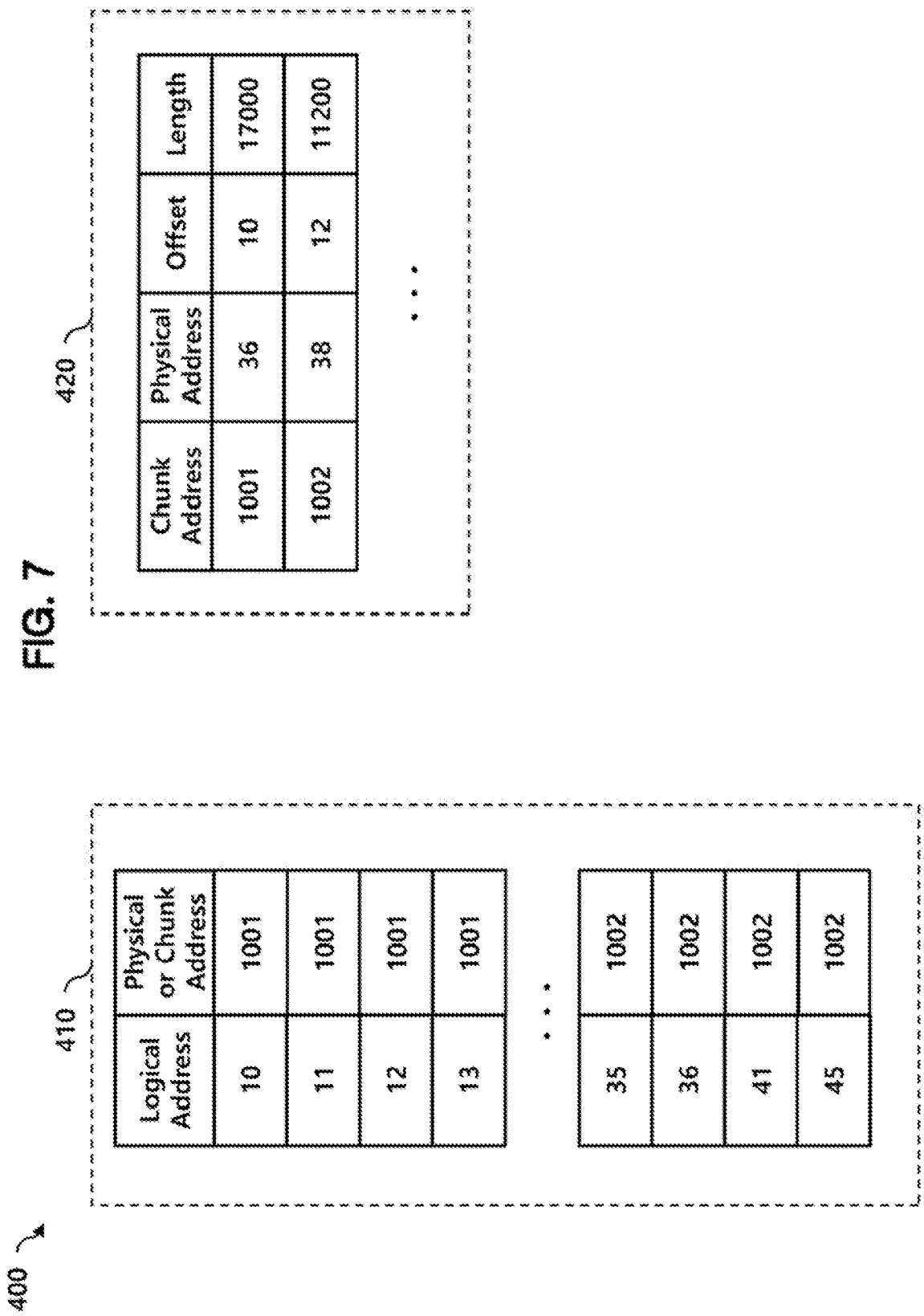
FIG. 7 is a diagram illustrating another example of the mapping table of FIG. 1.
Figure 8:
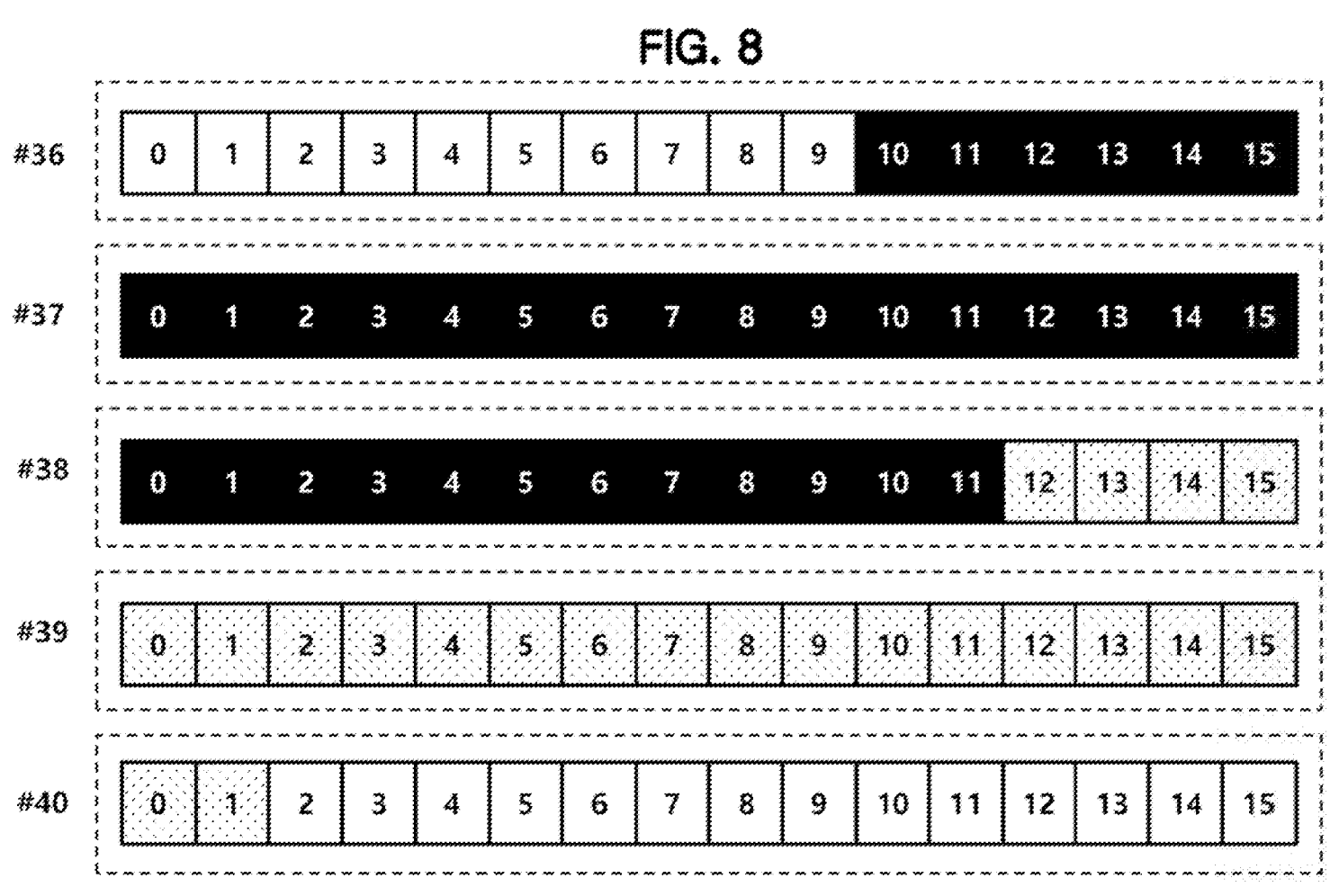

FIG. 7 is a diagram illustrating another example of the mapping table 400 of FIG. 1. FIG. 8 is a diagram illustrating a state in which a data chunk is stored in a physical page in the mapping table 400 of FIG. 7.

As illustrated in FIG. 7, logical addresses 10, 11, 12 and 13 correspond to a data chunk address 1001, and logical addresses 35, 36, 41 and 45 correspond to a data chunk address 1002.

The compressed data chunk of the data chunk address 1001 is written to from a 10th sub-page of a 36th page to a 11th sub-page of a 38th page, and has a length of 17,000 byte.

The compressed data chunk of the data chunk address 1002 is written following the compressed data chunk of the data chunk address 1001.

Thus, the compressed data chunk of the data chunk address 1002 is written from a 12th sub-page of the 38th page.

Since the compressed data chunk of the data chunk address 1002 has a length of 11,200 byte, the compressed data chunk of the data chunk address 1002 is written up to a first sub-page of a 40th page.

At this time, a remaining space of 64 bytes is created in the first sub-page of the 40th page.

Hereinafter, a case where a plurality of physical addresses corresponding to a data chunk address are stored in a mapping table is explained.

Figure 9:
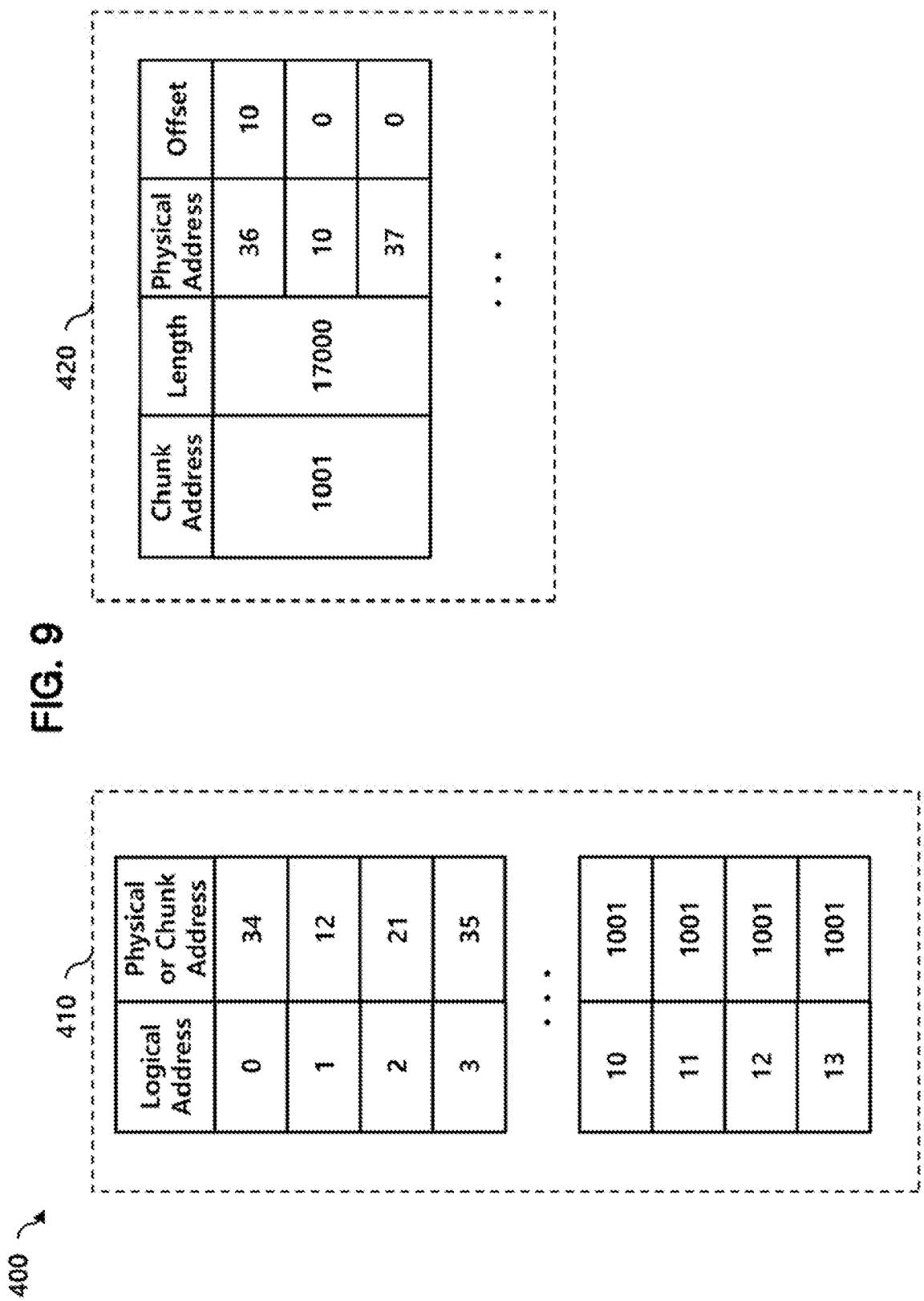
FIG. 9 is a diagram illustrating another example of the mapping table of FIG. 1.
Figure 10:
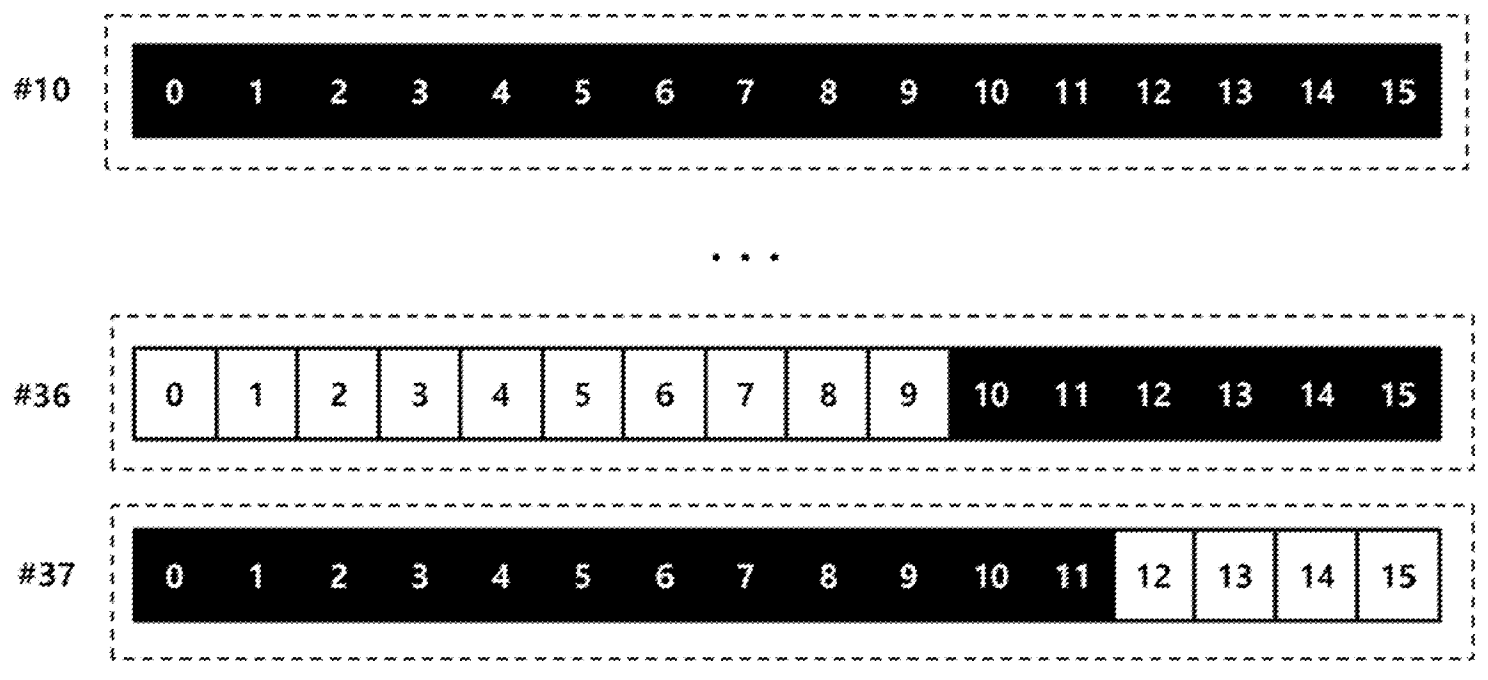

FIG. 9 is a diagram illustrating another example of the mapping table 400 of FIG. 1. FIG. 10 is a diagram illustrating a state in which a data chunk is stored in a physical page in the mapping table 400 of FIG. 9.

In FIG. 9, the second table 420 may Include physical addresses and offsets which are written according to an order in which a compressed data chunk is written.

That is, the compressed data chunk of the data chunk address 1001 is sequentially written to a space from a 10th sub-page of a 36th page to a 37th page through a 10th page.

The embodiment of FIG. 9 has an advantage in that a compressed data chunk does not need to be stored in consecutive physical addresses, but stored in inconsecutive physical addresses according to a mapping order. However, since a physical address needs to be additionally stored, the size of the second table may be increased.

As described above with reference to FIGS. 5 to 10, a compressed data chunk may be written to from the middle of a page.

In the case of a NAND flash memory device, a write operation is performed on a page basis. Therefore, a write operation on a compressed data chunk may be delayed until the next compressed data chunk is inputted to the write queue 600 to complete a page.

FIG. 11 is a block diagram for describing a method of the data storage device 1000 of FIG. 1 to write data stored in the write queue 600 in a memory cell array 500.

In the present embodiment, the controller 100 may further include a write control unit 150.

The write queue 600 may store write data outputted from the data compressor 300 on a page basis. The write control unit 150 may control an operation of the write queue 600 to store the write data provided from the data compressor 300 into the memory cell array 500 on a page basis, by referring to a physical address provided from the mapping table 400.

FIG. 12 is a diagram for describing an operation of the write queue 600 of FIG. 1.

In FIG. 12, suppose that the compressed data chunk of the data chunk address 1001 and the compressed data chunk of the data chunk address 1002 in FIG. 8 are sequentially inputted.

Furthermore, suppose that the zeroth to ninth sub-pages of the 36th page are stored in the write queue 600.

When the compressed data chunk of the data chunk address 1001 is inputted, the write queue 600 completes the 36th page by filling the 10 to 15th sub-pages of the 36th page.

Then, the write control unit 150 controls a write operation on the 36th page. At this time, the write control unit 150 may distinguish the physical address by referring to the mapping table 400.

Since the compressed data chunk of the data chunk address 1001 completely fills the 37th page, the write control unit 150 controls a write operation on the 37th page.

Since only the zeroth to 11th sub-pages of the 38th page corresponding to the compressed data chunk of the data chunk address 1001 in the write queue 600 are filled with the compressed data chunk, the write control unit 150 waits without performing a write operation on the 38th page.

Then, when the compressed data chunk of the data chunk address 1002 is inputted to the 12th to 15th sub-pages of the 38th page, the write control unit 150 controls a write operation on the 38th page.

Since the compressed data chunk of the data chunk address 1002 completely fills the 39th page in the write queue 600, the write control unit 150 controls a write operation on the 39th page.

Since only the zeroth and first sub-pages of the 40th page corresponding to the compressed data chunk of the data chunk address 1002 in the write queue 600 are filled with the compressed data chunk, the write control unit 150 does not perform a write operation on the 40th page, but waits until the 40th page is completed.

That is, the controller 100 may control an operation of storing write data outputted from the write queue 600 in the memory cell array 500 by referring to a physical address provided from the mapping table 400, such that a page including both a part of any one compressed data chunk and a part of another compressed data chunk is written to the memory cell array 500.

According to the present embodiment, the data storage device compresses data on a data chunk basis including a plurality of pages, thereby improving a compression rate of data.

The data storage device generates a data chunk by collecting pages with a high similarity, thereby raising a compression rate of data.

The data storage device selectively compresses a plurality of pages, thereby preventing a performance reduction caused by unnecessary compression.

The table structure according to the present embodiment prevents an excessive increase in size of the mapping table.

Although various embodiments have been described for illustrative purposes, it will be apparent to those skilled in the art that various changes and modifications may be made without departing from the spirit and scope of the invention as defined in the following claims.

What is claimed is:

1. A data storage device comprising:
    a memory cell array configured to store data on a page basis;
    a data buffer configured to generate a data chunk including a plurality of pages from input data provided from a host;
    a data compressor configured to compress the data chunk and output the compressed data chunk as write data;
    a write queue configured to store the write data on a page basis;
    a mapping table configured to store a mapping relationship between a logical page address and a data chunk address, and a mapping relationship between the data chunk address and a physical page address; and a controller configured to control an operation of storing the write data outputted from the write queue in the memory cell array such that a page including both a part of any one compressed data chunk and a part of another compressed data chunk is written to the memory cell array.

2. The data storage device of claim 1, wherein the controller comprises:

a characteristic comparator configured to compare characteristics of the input data provided from the host; and a buffer controller configured to adjust an order of the input data according to a comparison result of the characteristic comparator.

3. The data storage device of claim 2, wherein the buffer controller adjusts the order of the input data such that data having similar characteristics are arranged close to each other, according to the comparison result of the characteristic comparator.

4. The data storage device of claim 1, wherein the controller comprises:

a compression controller configured to control the data compressor to output the data chunk or the compressed data chunk as the write data.

5. The data storage device of claim 4, wherein the controller further comprises:

a mapping controller configured to control the mapping table according to control of the compression controller, wherein the mapping controller controls the mapping table to map a physical page address to a logical page address, when the compression controller controls the data compressor not to compress the data chunk, and controls the mapping table to map the data chunk address to the logical page address and map the physical page address to the data chunk address, when the compression controller controls the data compressor to compress the data chunk.

6. The data storage device of claim 4, wherein the compression controller samples a compression rate of the data chunk at each predetermined cycle, and controls whether to perform compression according to a sampling result.

7. The data storage device of claim 6, wherein the compression controller controls the data compressor not to compress the data chunk when a sampling result indicating that the compression rate is lower than a threshold value is consecutively obtained a predetermined number of times, and controls the data compressor to compress the data chunk when a sampling result indicating that the compression rate is equal to or higher than the threshold value is consecutively obtained the predetermined number of times.

8. The data storage device of claim 1, wherein the mapping table comprises:

a first table for storing the mapping relationship between the logical page address and the data chunk address; and a second table for storing the mapping relationship between the data chunk address and the physical page address, wherein the second table further stores offset information on a start position of a compressed data chunk corresponding to the data chunk address in the physical page address, and a length of the compressed data chunk.

9. The data storage device of claim 8, wherein one data chunk address in the second table is mapped to one physical page address.

10. The data storage device of claim 9, wherein the controller controls the memory cell array to write a compressed data chunk corresponding to a data chunk address to one physical page address or two or more consecutive physical page addresses.

11. The data storage device of claim 8, wherein one data chunk address in the second table is mapped to two or more inconsecutive physical page addresses, and the two or more physical page addresses are mapped according to an order in which a compressed data chunk corresponding to the one data chunk address is written.

12. The data storage device of claim 11, wherein the controller controls the memory cell array to write the compressed data chunk corresponding to the data chunk address to two or more inconsecutive physical page addresses.

13. The data storage device of claim 1, wherein the write queue forms one page by combining a part of a first compressed data chunk outputted from the data compressor and a part of a second compressed data chunk outputted from the data compressor after the first compressed data chunk.

14. The data storage device of claim 1, wherein the controller comprises a write controller configured to write the write data outputted from the write queue to the memory cell array on a page basis, and the write controller does not perform a write operation on the part of the any one compressed data chunk until the part of the another compressed data chunk is inputted to the write queue to complete the page.

15. The data storage device of claim 14, wherein the write queue outputs the write data including the part of the any one compressed data chunk and the part of the another compressed data chunk on a page basis.

16. A data storage device comprising:

a memory cell array configured to store data on a page basis;

a data buffer configured to generate a data chunk including at least two pages based on input data provided from a host;

a data compressor configured to selectively compress the data chunk and output the compressed data chunk as write data;

a write queue configured to store the write data on a page basis;

a mapping table configured to store a mapping relationship between a logical page address, a data chunk address, and a physical page address; and a controller configured to control a write operation on the write data from the write queue to the memory cell array on the page basis, by referring to the physical page address stored in the mapping table.

17. The data storage device of claim 16, wherein the write operation is performed on a page including a part of a first compressed data chunk and a part of a second compressed data chunk, and the controller controls the write operation not to be performed on the part of the first compressed data chunk until the part of the second compressed data chunk is inputted to the write queue to complete the page.

18. The data storage device of claim 16, wherein the controller comprises:

a characteristic comparator configured to analyze characteristics of the input data to output a comparison result;

a buffer controller configured to control the data buffer to adjust an order of the input data according to the comparison result;

a compression controller configured to control the data compressor to output the data chunk or the compressed data chunk as the write data;

a mapping controller configured to control the mapping table according to control of the compression controller; and a write controller configured to control the write queue to write the write data to the memory cell array on a page basis.

19. The data storage device of claim 18, wherein the mapping controller controls the mapping table to map the physical page address to the logical page address, when the compression controller controls the data compressor not to compress the data chunk, and controls the mapping table to map the data chunk address to the logical page address and map the physical page address to the data chunk address, when the compression controller controls the data compressor to compress the data chunk.

20. The data storage device of claim 16, wherein the mapping table comprises:

a first table for storing a mapping relationship between the logical page address and the data chunk address; and a second table for storing a mapping relationship between the data chunk address and the physical page address, wherein the second table further stores offset information on a start position of a compressed data chunk corresponding to the data chunk address in the physical page address, and a length of the compressed data chunk.

* * * * *